(12) United States Patent
Contreras et al.

(10) Patent No.: US 11,353,112 B2
(45) Date of Patent: Jun. 7, 2022

(54) GASKET AND GROMMET INSTALLATION ASSEMBLY

(71) Applicant: Federal-Mogul Motorparts LLC, Southfield, MI (US)

(72) Inventors: Abel Contreras, Berkeley, IL (US); Sean Smith, Aurora, IL (US); Brent Loomis, Chicago, IL (US)

(73) Assignee: Federal-Mogul Motorparts LLC, Southfield, MI (US)

( * ) Notice: Subject to any disclaimer, the term of this patent is extended or adjusted under 35 U.S.C. 154(b) by 440 days.

(21) Appl. No.: 16/583,748

(22) Filed: Sep. 26, 2019

(65) Prior Publication Data

US 2020/0103031 A1    Apr. 2, 2020

Related U.S. Application Data

(60) Provisional application No. 62/737,955, filed on Sep. 28, 2018.

(51) Int. Cl.
*F16J 15/08* (2006.01)

(52) U.S. Cl.
CPC ........ *F16J 15/0831* (2013.01); *F16J 15/0825* (2013.01); *F16J 2015/0856* (2013.01); *F16J 2015/0868* (2013.01)

(58) Field of Classification Search
CPC .... F16J 15/061; F16J 15/0818; F16J 15/0825; F16J 15/0831; F16J 2015/0862; F16J 2015/0868; B25B 27/0028
See application file for complete search history.

(56) References Cited

U.S. PATENT DOCUMENTS

| | | | | |
|---|---|---|---|---|
| 4,103,913 A | * | 8/1978 | McDowell | F16J 15/0818 277/592 |
| 5,564,714 A | * | 10/1996 | Katsuno | B29C 37/02 277/924 |
| 5,713,582 A | * | 2/1998 | Swensen | F16J 15/061 277/630 |
| 5,730,448 A | * | 3/1998 | Swensen | F16J 15/0806 277/630 |
| 5,735,532 A | * | 4/1998 | Nolan | F16J 15/061 277/630 |
| 5,735,533 A | * | 4/1998 | Nolan | F16J 15/062 277/630 |
| 6,015,152 A | | 1/2000 | Swensen et al. | |
| 6,575,473 B2 | | 6/2003 | Sugimoto et al. | |

(Continued)

FOREIGN PATENT DOCUMENTS

DE    102005055480 A1    5/2007
WO       2006130446 A2    12/2006

OTHER PUBLICATIONS

International Search Report and Written Opinion of International Searching Authority in PCT/US2019/053133 dated Dec. 9, 2019, 9 pages.

*Primary Examiner* — Nicholas L Foster
(74) *Attorney, Agent, or Firm* — Federal-Mogul Motorparts LLC

(57) ABSTRACT

A gasket assembly includes a gasket body, an adhesive-backed film, and a plurality of grommets. The gasket body includes a first face, and the adhesive-backed film includes a sticky face bonded to the first face of the gasket body. The grommets are bonded to the sticky face of the adhesive-backed film.

19 Claims, 5 Drawing Sheets

(56) References Cited

U.S. PATENT DOCUMENTS

| | | | |
|---|---|---|---|
| 6,926,286 B2* | 8/2005 | Shibata | F16J 15/061 |
| | | | 277/630 |
| 6,945,539 B2* | 9/2005 | Whitlow | F16J 15/0887 |
| | | | 277/609 |
| 7,316,401 B2* | 1/2008 | Casler | F16J 15/126 |
| | | | 277/630 |
| 7,584,582 B1 | 9/2009 | Hutter, III | |
| 8,220,800 B2 | 7/2012 | Umehara et al. | |
| 8,246,053 B2* | 8/2012 | Shaver | F01N 13/1827 |
| | | | 277/654 |
| 8,550,469 B2 | 10/2013 | Virgin et al. | |
| 8,833,772 B2* | 9/2014 | Sasaki | F16J 15/104 |
| | | | 277/630 |
| 9,816,460 B2 | 11/2017 | Kondo et al. | |
| 2002/0112684 A1 | 8/2002 | Jones et al. | |
| 2005/0023768 A1 | 2/2005 | Adams et al. | |
| 2006/0273527 A1* | 12/2006 | Casler | F16J 15/126 |
| | | | 277/592 |
| 2011/0233875 A1* | 9/2011 | Shaver | F01N 13/1827 |
| | | | 277/592 |
| 2019/0063537 A1* | 2/2019 | Dawson | F16L 37/22 |

\* cited by examiner

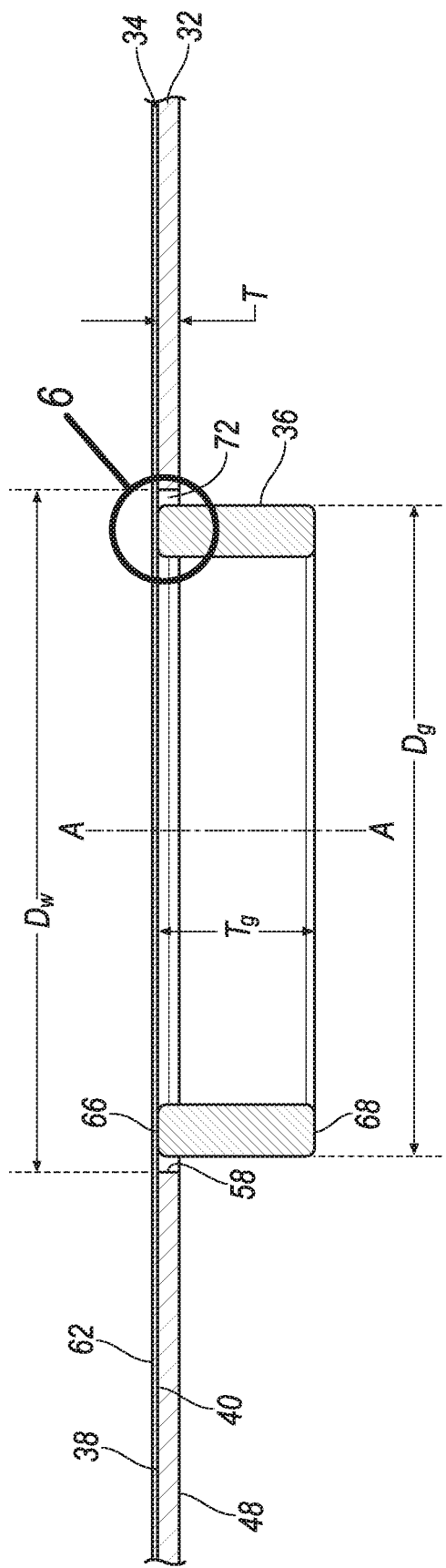
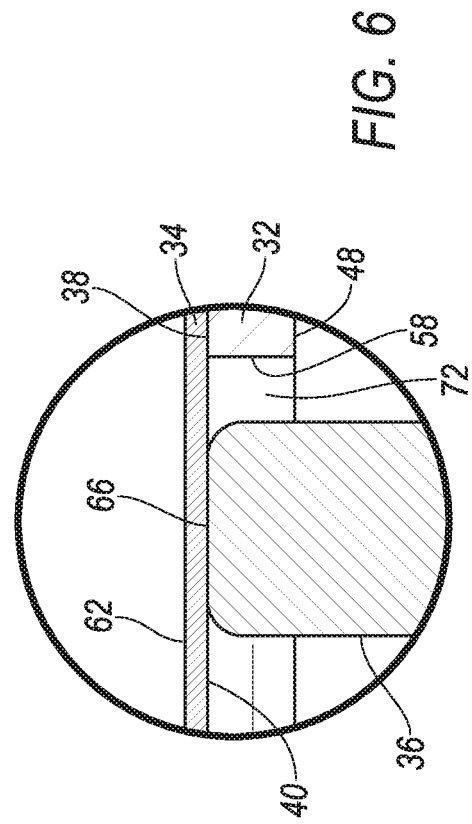
FIG. 5
FIG. 6

GASKET AND GROMMET INSTALLATION ASSEMBLY

CROSS-REFERENCE TO RELATED APPLICATIONS

This patent application claims priority to and all the benefits of U.S. Provisional Patent Application No. 62/737,955 filed on Sep. 28, 2018, which is herein incorporated by reference in its entirety.

BACKGROUND

When building or rebuilding certain types of engines, a gasket body and a plurality of grommets are installed between an engine block and a cylinder head. Individually placing the grommets can be a time-consuming process, and keeping track of a large number of grommets can raise a risk of losing one or more grommets.

BRIEF DESCRIPTION OF THE DRAWINGS

FIG. 5 is a cross-sectional view of a portion of the gasket assembly along line 5-5 in FIG. 4.

FIG. 6 is a cross-sectional view of a zoomed-in portion of FIG. 5.

DETAILED DESCRIPTION

Figure 1:
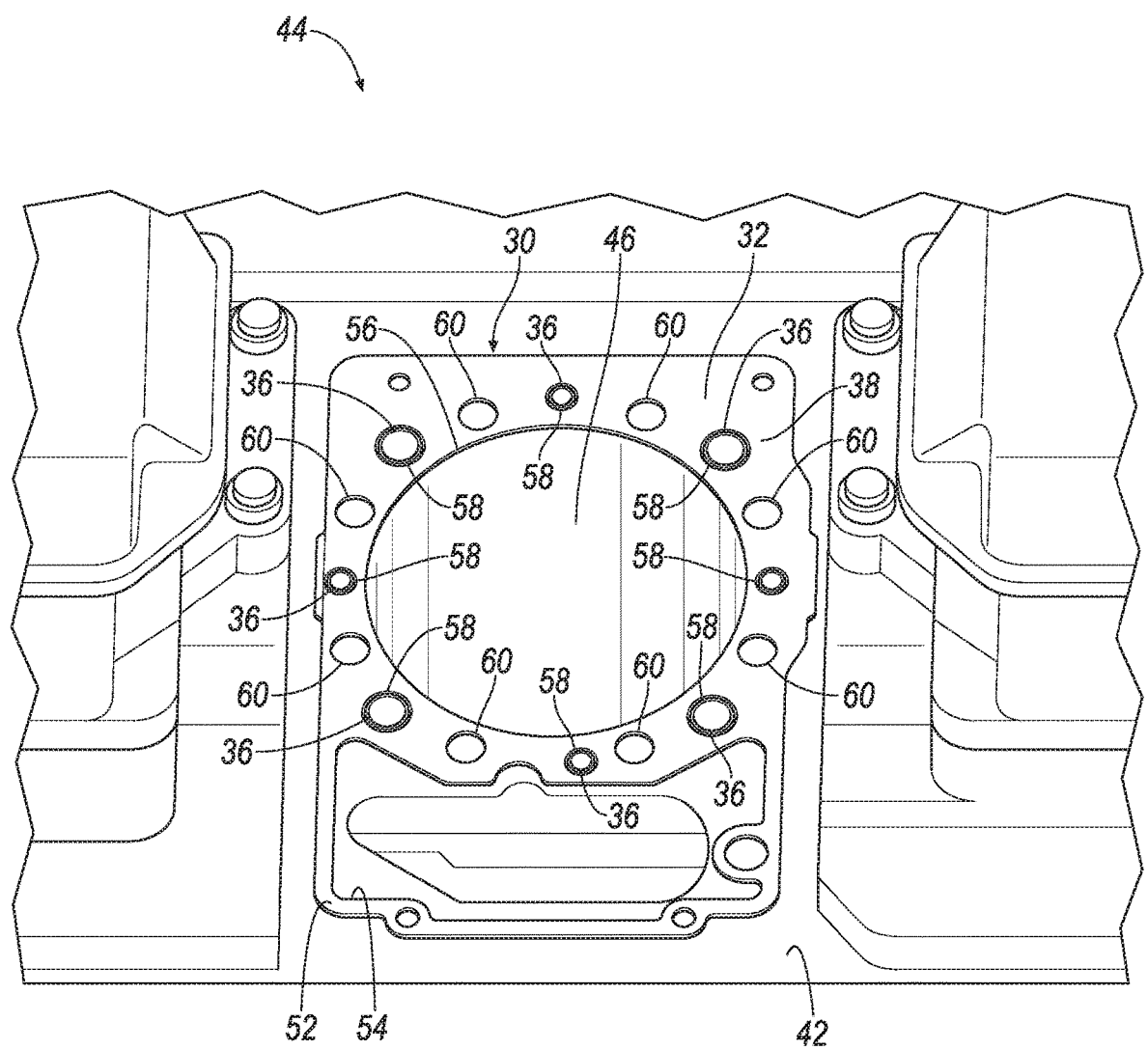
FIG. 1 is a perspective view of a portion of an example engine.

With reference to the Figures, a gasket assembly 30 includes a gasket body 32, an adhesive-backed film 34, and a plurality of grommets 36. The gasket body 32 includes a first face 38, and the adhesive-backed film 34 includes a sticky face 40 bonded to the first face 38 of the gasket body 32. The grommets 36 are bonded to the sticky face 40 of the adhesive-backed film 34.

The gasket assembly 30 saves time and reduces the likelihood of dropping or losing the grommets 36 when installing the gasket body 32 to an engine block 42. The gasket assembly 30 permits the gasket body 32 and the grommets 36 to be placed in the proper location on the engine block 42 in one step, rather than individually placing the grommets 36. By keeping the grommets 36 with the larger gasket body 32, the gasket assembly 30 reduces the likelihood that the grommets 36 will be dropped or lost.

With reference to FIG. 1, the gasket assembly 30 is used to install the gasket body 32 and the grommets 36 to the engine block 42. The engine block 42 is part of an engine 44 that generates energy by internal combustion. The engine block 42 includes a plurality of cylinders 46. The cylinders 46 are shaped to accept pistons (not shown), which are moved in the respective cylinders 46 by the internal-combustion process.

When installed on the engine block 42, the gasket body 32 serves as a spacer for a cylinder head (not shown), which enclose the cylinders 46. When installed, the grommets 36 serve as seals for coolant such as water to flow through coolant channels (not shown) in the engine block 42 and cylinder head around the cylinders 46, which can absorb and remove heat generated by the cylinders 46.

Figure 2:
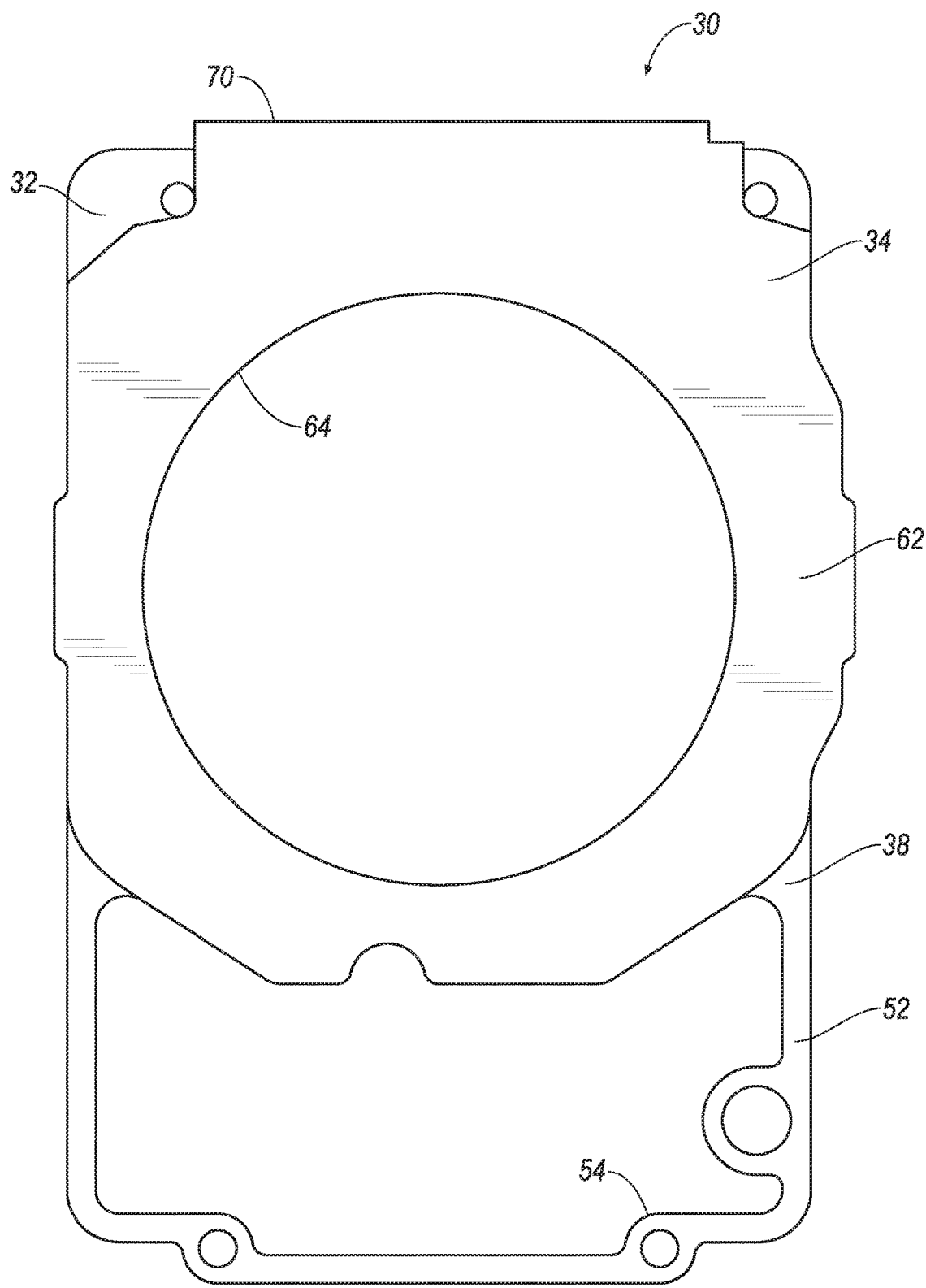
FIG. 2 is a front plan view of an example gasket assembly.
Figure 3:
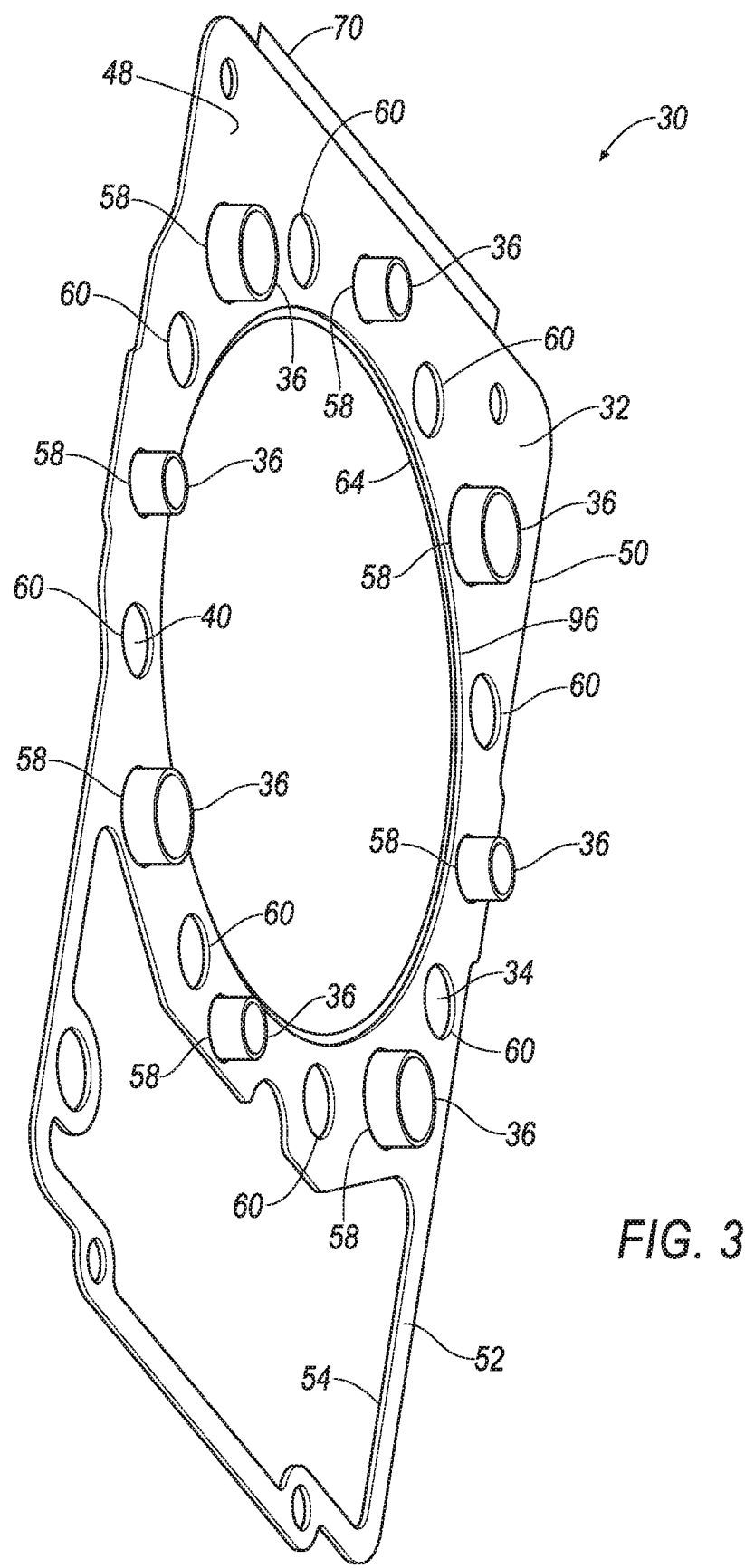
FIG. 3 is a rear side perspective view of the gasket assembly.
Figure 4:
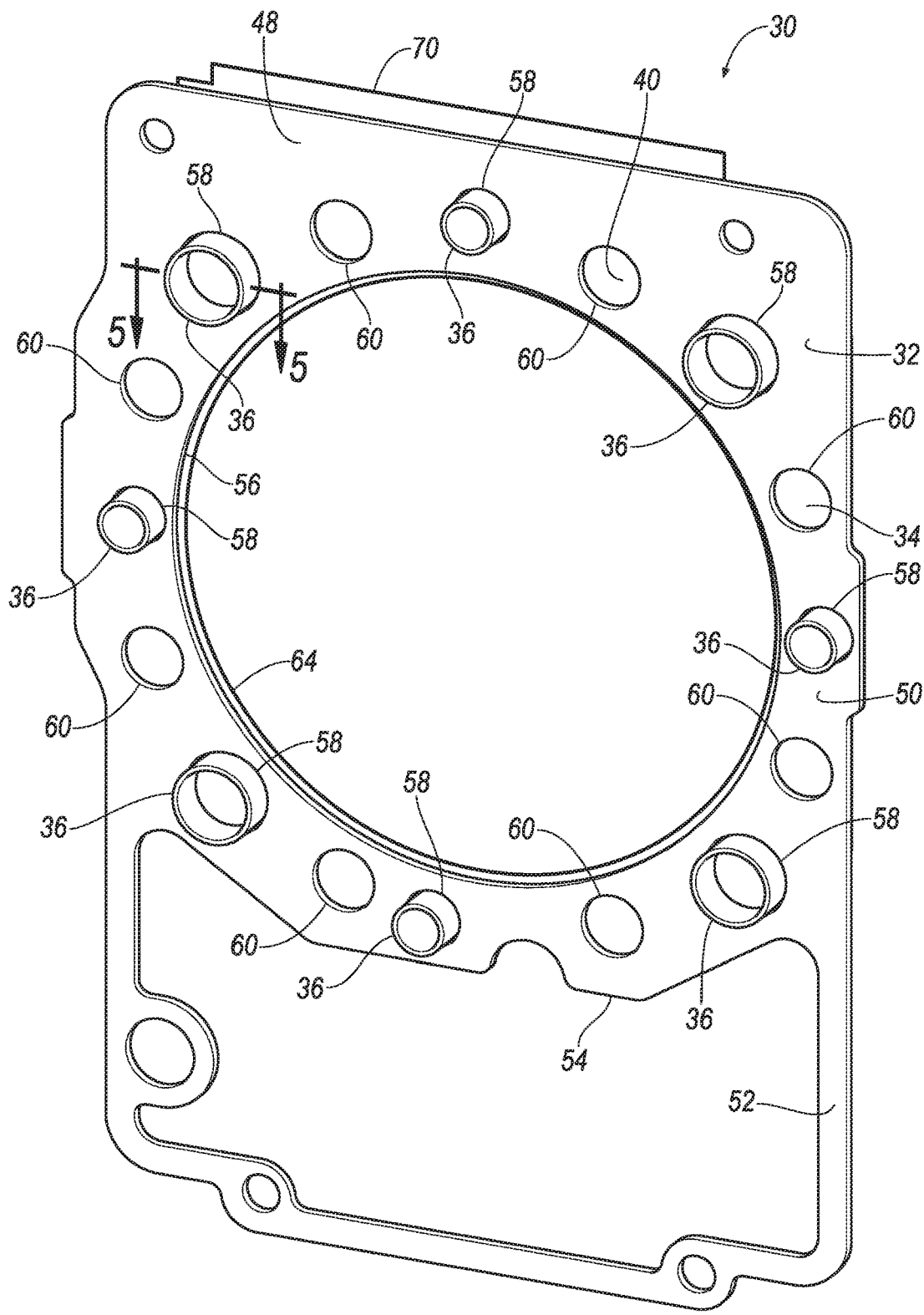
FIG. 4 is a rear perspective view of the gasket assembly.

With reference to FIGS. 2-4, the gasket body 32 has a planar shape. The gasket body 32 includes the first face 38 and a second face 48 opposite the first face 38. The first face 38 and the second face 48 face in opposite directions. The first face 38 and the second face 48 are planar and parallel to each other. The first face 38 and the second face 48 are separated by a substantially constant thickness T.

The gasket body 32 is a monolithic piece, i.e., a continuous piece with no internal seams between parts of the piece. The gasket body 32 is a nonelastomeric material with sufficient strength and hardness for use in the engine 44, e.g., a metal such as aluminum or steel. Alternatively, the gasket body 32 could include multiple layers parallel to the first face 38 and second face 48. The gasket body 32 can be shaped through a blanking operation.

The gasket body 32 includes a main body 50 and a push-rod-opening frame 52 extending from the main body 50. The main body 50 and the push-rod-opening frame 52 form an entirety of the gasket body 32. The push-rod-opening frame 52 defines a push-rod opening 54 bordering the main body 50; in other words, the main body 50 and the push-rod-opening frame 52 form the push-rod opening 54. The main body 50 forms a top of the push-rod opening 54 (as oriented in the Figures), and the push-rod-opening frame 52 forms sides and a bottom of the push-rod opening 54.

The gasket body 32 includes a cylinder bore 56. The main body 50 of the gasket body 32 extends completely around the cylinder bore 56. The cylinder bore 56 has a circular shape. The cylinder bore 56 extends through the gasket body 32 from the first face 38 to the second face 48 in a direction orthogonal to the first face 38 and to the second face 48. The diameter of the cylinder bore 56 is substantially equal to the diameter of the cylinder 46 in the engine block 42. When the gasket body 32 is installed, the cylinder bore 56 aligns with the cylinder 46.

The gasket body 32, e.g., the main body 50, includes a plurality of water ports 58. Each water port 58 has a circular shape. The water ports 58 extend through the gasket body 32 from the first face 38 to the second face 48 in a direction orthogonal to the first face 38 and to the second face 48. The water ports 58 are arranged circumferentially around the cylinder bore 56. For example, as shown in the Figures, the gasket body 32 includes eight water ports 58. The water ports 58 are each approximately the same radial distance from the center of the cylinder bore 56. Each water port 58 is approximately the same distance from the circumferentially adjacent water ports 58 in either circumferential direction from the water port 58.

The gasket body 32, e.g., the main body 50, includes a plurality of bolt openings 60. Each bolt opening 60 has a circular shape. The bolt openings 60 extend through the gasket body 32 from the first face 38 to the second face 48 in a direction orthogonal to the first face 38 and to the second face 48. The bolt openings 60 are arranged circumferentially around the cylinder bore 56. For example, as shown in the Figures, the gasket body 32 includes eight bolt openings 60. The bolt openings 60 are each approximately the same radial distance from the center of the cylinder bore 56. Each bolt opening 60 is approximately the same distance from the circumferentially adjacent bolt openings 60 in either circumferential direction from the bolt opening 60. The water ports 58 and the bolt openings 60 are arranged in an alternating pattern around the cylinder bore 56; i.e., each water port 58 is circumferentially adjacent to one of the bolt openings 60 in each circumferential direction around the cylinder bore 56, and each bolt opening 60 is circumferentially adjacent to one of the water ports 58 in each circumferential direction around the cylinder bore 56.

The adhesive-backed film 34 is a thin substrate onto which adhesive is applied. The thin substrate can be any suitably flimsy and tear-resistant material, e.g., vinyl, fabric, etc. The material of the substrate can be chosen so that the adhesive will bind more strongly to the substrate than to the gasket body 32 and more strongly to the substrate than to the grommets 36. The adhesive-backed film 34 includes the sticky face 40, onto which the adhesive has been applied, and a nonsticky face 62, onto which adhesive has not been applied, opposite the sticky face 40.

The sticky face 40 of the adhesive-backed film 34 is bonded to the first face 38 of the gasket body 32. The adhesive-backed film 34 covers the main body 50 of the gasket body 32 and does not extend across the push-rod opening 54 or the push-rod-opening frame 52. An outer edge of the adhesive-backed film 34 generally follows an outer edge of the main body 50 of the gasket body 32. The adhesive-backed film 34 includes a tab 70 extending outward from the outer edge of the gasket body 32. The tab 70 provides a place for a technician to grip the adhesive-backed film 34 in the process of removing the adhesive-backed film 34 from the gasket body 32.

The adhesive-backed film 34 includes a cylinder-bore hole 64 positioned concentrically with the cylinder bore 56 of the gasket body 32. The cylinder-bore hole 64 is circular, and the diameter of the cylinder-bore hole 64 is approximately equal to or slightly less than the diameter of the cylinder bore 56. The adhesive-backed film 34 covers the water ports 58 and the bolt openings 60; i.e., the adhesive-backed film 34 has no openings corresponding to the water ports 58 or the bolt openings 60.

With reference to FIGS. 5 and 6, the grommets 36 have an annular shape. Each grommet 36 has a cross-section of a circular wall with a constant thickness, and the cross-section is elongated along an axis A orthogonal to the cross-section from a first end 66 of the grommet 36 to a second end 68 of the grommet 36. In other words, the grommets 36 each have a cylindrical, tubular shape from the first end 66 to the second end 68 with the first end 66 open and the second end 68 open. The thickness $T_g$ of the grommets 36 in a direction orthogonal to the first face 38 of the gasket body 32, i.e., in a direction along the axis A, is greater than the thickness T of the gasket body 32. The axial thickness $T_g$ of the grommets 36 can be, e.g., more than twice as long as the thickness T of the gasket body 32.

The grommets 36 are an elastomeric material. Elastomeric materials generally have a low Young's modulus and a high failure strain. For example, the grommets 36 can be rubber, polyurethane, silicone, etc.

The grommets 36, in particular, the first ends 66 of the grommets 36, are bonded to the sticky face 40 of the adhesive-backed film 34. The first end 66 of each grommet 36 is thus coplanar with the first face 38. Each grommet 36 is positioned in a respective one of the water ports 58. The diameter $D_g$ of each grommet 36 is smaller than the diameter $D_w$ of the respective water port 58, and each grommet 36 is positioned concentrically in the respective water port 58. The grommets 36 are thus each spaced from the gasket body 32, specifically, spaced radially inwardly from the respective water port 58; in other words, because of the concentric positioning of the grommets 36 in the water ports 58, the grommets 36 do not contact the edges of the water ports 58 or any other part of the gasket body 32. There is a concentric gap 72 between each grommet 36 and the respective water port 58. The concentric gap 72 has a radial distance substantially equal to $(D_w-D_g)/2$.

The adhesive-backed film 34 holds itself, the gasket body 32, and the grommets 36 together and keeps these components in place. Thus, the gasket assembly 30 can be manufactured and assembled in one location and shipped to another location to install in the engine 44. The gasket assembly 30 can thus be mass-produced, allowing reduced costs.

To install the gasket body 32 and the grommets 36 to the engine block 42, a technician first places the gasket assembly 30 on the engine block 42 so that the cylinder bore 56 is aligned with the cylinder 46 and the water ports 58 are lined up with the coolant channels. To achieve proper alignment, rods can be placed in bolt holes of the engine block 42, and the gasket assembly 30 can be placed so that the rods extend through the bolt openings 60. The gasket assembly 30 is placed so that the first face 38 and the adhesive-backed film 34 face away from the engine block 42. The grommets 36 will extend into the respective coolant channels. The adhesive-backed film 34 is then removed, e.g., peeled off, leaving both the gasket body 32 and the grommets 36 in the proper place relative to the engine block 42, as shown in FIG. 1. While the adhesive-backed film 34 is removed, the weight of the gasket body 32 and the axial thickness $T_g$ of the grommets 36 extending into the coolant channels keeps the gasket body 32 and the grommets 36 in place. When the cylinder head is placed on the gasket body 32, the grommets 36 are compressed along the axis A, pushing each grommet 36 radially outward to press against the respective coolant channel. The rods can be removed, and bolts can be inserted through the bolt openings 60 and tightened to compress the cylinder head, the gasket body 32, and the engine block 42 together.

The disclosure has been described in an illustrative manner, and it is to be understood that the terminology which has been used is intended to be in the nature of words of description rather than of limitation. "Substantially" as used herein means that a dimension, time duration, shape, or other adjective may vary slightly from what is described due to physical imperfections, power interruptions, variations in machining or other manufacturing, etc. The adjectives "first" and "second" are used throughout this document as identifiers and are not intended to signify importance, order, or quantity. Many modifications and variations of the present disclosure are possible in light of the above teachings, and the disclosure may be practiced otherwise than as specifically described.

What is claimed is:

1. A gasket assembly comprising:
a gasket body including a first face;
an adhesive-backed film including a sticky face, the sticky face bonded to the first face of the gasket body; and
a plurality of grommets bonded to the sticky face of the adhesive-backed film.

2. The gasket assembly of claim 1, wherein the gasket body includes a plurality of water ports, wherein each grommet is positioned in a respective one of the water ports.

3. The gasket assembly of claim 2, wherein the water ports are circular, and the grommets have an annular shape.

4. The gasket assembly of claim 3, wherein the diameter of each grommet is smaller than the diameter of the respective water port, and each grommet is positioned concentrically in the respective water port.

5. The gasket assembly of claim 2, wherein the gasket body includes a cylinder bore.

6. The gasket assembly of claim 5, wherein the water ports are arranged circumferentially around the cylinder bore.

7. The gasket assembly of claim 5, wherein the gasket body includes a plurality of bolt openings.

8. The gasket assembly of claim 7, wherein the water ports and bolt openings are arranged circumferentially around the cylinder bore.

9. The gasket assembly of claim 8, wherein the water ports and the bolt openings are arranged in an alternating pattern around the cylinder bore.

10. The gasket assembly of claim 7, wherein the adhesive-backed film covers the bolt openings.

11. The gasket assembly of claim 5, wherein the adhesive-backed film includes a cylinder-bore hole positioned concentrically with the cylinder bore of the gasket body.

12. The gasket assembly of claim 5, wherein the gasket body includes a main body extending around the cylinder bore and a push-rod-opening frame extending from the main body and defining a push-rod opening bordering the main body.

13. The gasket assembly of claim 12, wherein the adhesive-backed film covers the main body of the gasket body and does not extend across the push-rod opening or push-rod-opening frame.

14. The gasket assembly of claim 1, wherein the grommets are each spaced from the gasket body.

15. The gasket assembly of claim 1, wherein a thickness of the grommets in a direction orthogonal to the first face is greater than a thickness of the gasket body in the direction orthogonal to the first face.

16. The gasket assembly of claim 1, wherein the gasket body has a planar shape.

17. The gasket assembly of claim 1, wherein the gasket body is a monolithic piece.

18. The gasket assembly of claim 1, wherein the grommets are an elastomeric material.

19. The gasket assembly of claim 18, wherein the gasket body is a nonelastomeric material.

* * * * *